United States Patent [19]
Huang

[11] Patent Number: 5,203,709
[45] Date of Patent: Apr. 20, 1993

[54] DEVICE FOR COUPLING A BATTERY TO AN ELECTRIC APPLIANCE

[76] Inventor: Ming-Chuan Huang, 58, Ma Yuan West St., Taichung, Taiwan

[21] Appl. No.: 884,437

[22] Filed: May 18, 1992

[51] Int. Cl.⁵ .............................................. H01R 11/30
[52] U.S. Cl. ...................................... 439/38; 439/500; 429/100
[58] Field of Search .................. 439/38–40, 439/500, 627, 527, 529; 429/10, 100, 121; 248/206.5

[56] References Cited

U.S. PATENT DOCUMENTS

| | | | |
|---|---|---|---|
| 1,498,951 | 6/1924 | Coates | 439/39 |
| 2,293,354 | 8/1942 | Munchow | 439/500 |
| 4,042,754 | 8/1977 | Borello | 429/10 |
| 4,319,178 | 3/1982 | Sugalski | 429/100 |
| 4,806,440 | 2/1989 | Hahs, Jr. et al. | 429/100 |

Primary Examiner—Gary F. Paumen
Assistant Examiner—Hien D. Vu

[57] ABSTRACT

A device for coupling a battery to an electric appliance including two magnetic plates, one of the magnetic plates having an opening for engagement with a center electrode of the battery, the other magnetic plate attractable to the case electrode of the battery, and a wire for electrically coupling the magnetic plates to the electric appliance in order to energize the electric appliance.

3 Claims, 3 Drawing Sheets

DEVICE FOR COUPLING A BATTERY TO AN ELECTRIC APPLIANCE

BACKGROUND OF THE INVENTION (a) Field of the Invention

The present invention relates to a device, and more particularly to a device for coupling one or more batteries to an electric appliance.

(b) Description of the Prior Art

Typically, in order to energize an electric appliance, one or more batteries should be disposed in a given socket and the like. For electric appliances which have no sockets provided therewith, it is very difficult to couple batteries to such electric appliances. Particularly, for students making some experiments, it is usually required to couple batteries to the electric appliances, however, no devices were provided for this purposes.

The present invention has arisen to provide a novel device for coupling batteries to electric appliances.

SUMMARY OF THE INVENTION

The primary objective of the present invention is to provide a device with which batteries can be easily coupled to electric appliances.

In accordance with one aspect of the present invention, there is provided a device for coupling at least one battery to an electric appliance comprising a first magnetic plate having an opening formed therein for engagement with a center electrode of the battery, means for electrically coupling the first magnetic plate to the electric appliance, a second magnetic plate attractable to a case electrode of the battery, and means for electrically coupling the second magnetic plate to the electric appliance in order to energize the electric appliance.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
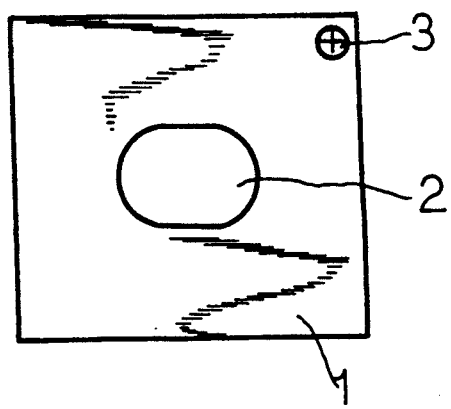
FIG. 1 is a front view of a plate of a device in accordance with the present invention.
Figure 2:
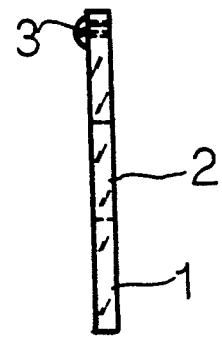
FIG. 2 is a side view of the plate.
Figure 3:
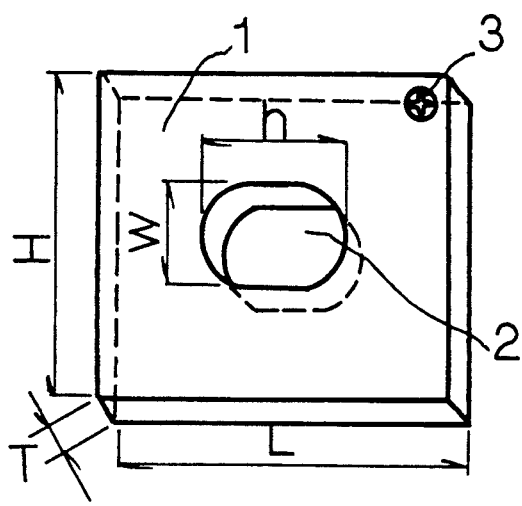
FIG. 3 is a perspective view of the plate.
Figure 4:
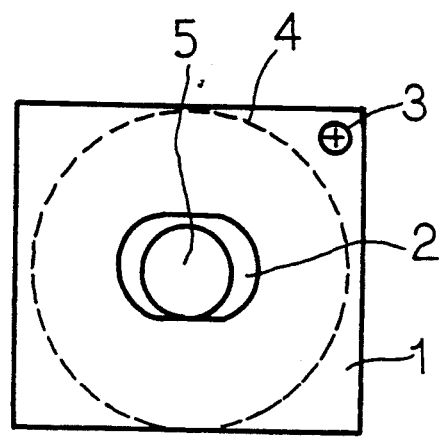
FIGS. 4, 5 and 6 are schematic views illustrating the coupling of the plate to a battery.
Figure 5:
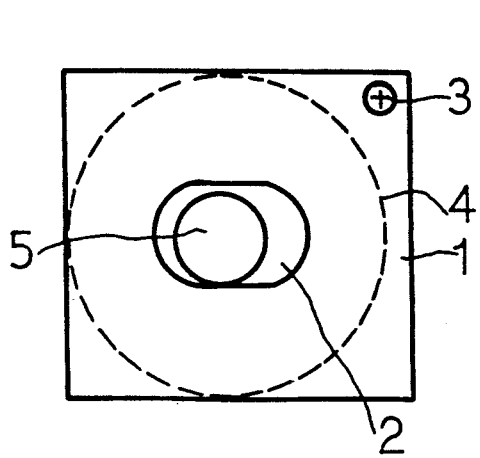
Figure 6:
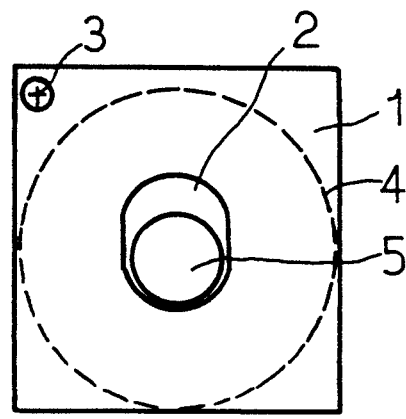

Referring to the drawings and initially to FIGS. 1 and 2, a device in accordance with the present invention is generally provided for coupling one or more batteries to an electric appliance, and comprises generally two or more plates 1 each having an opening, such as an oblong hole 2 formed therein and having a screw 3 threaded thereto. Each of the plates 1 is made of electric conductive and magnetic materials for attracting the center and case electrodes of the batteries.

Figures 7, 8:
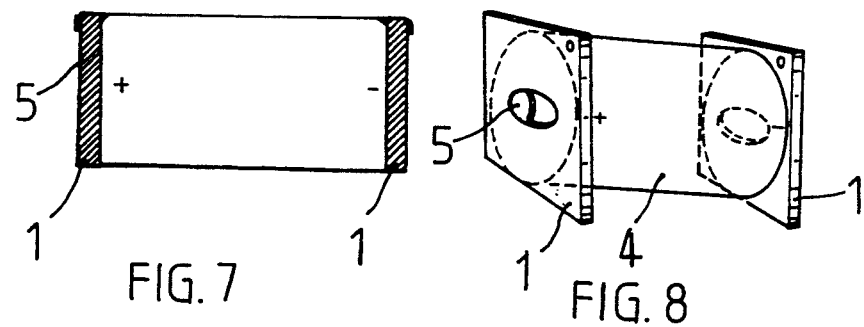
FIG. 7 is a cross sectional view of the device coupled to a battery.
FIG. 8 is a perspective view of the device coupled to a battery.

Referring next to FIGS. 3 to 8, each of the plates 1 includes a length "L", a height "H" and a thickness "T", in which the length L is preferably larger than the height H. The height "H" of the plate 1 is slightly larger than the outer diameter of the battery 4, and the length "L" of the plate 1 has 4 mm larger than the outer diameter of the battery 4. The oblong hole 2 includes a height "h" and a width "w" which is preferably larger than the height "h". The center electrode 5 of the battery 4 is insertable and engageable in the oblong hole 2 of each of the plates 1, it is preferable that the height "h" of the oblong hole 2 is slightly larger than the diameter of the center electrode 5, and the width "w" of the oblong hole 2 has 4 mm larger than the diameter of the center electrode 5, best shown in FIGS. 4 to 6. As shown in FIG. 8, the center electrode 5 of the battery 4 is engaged in the oblong hole 2 of one of the plates 1 and is attracted by the plate 1, and the other plate 1 is attracted to the case electrode of the battery 4.

Figure 9:
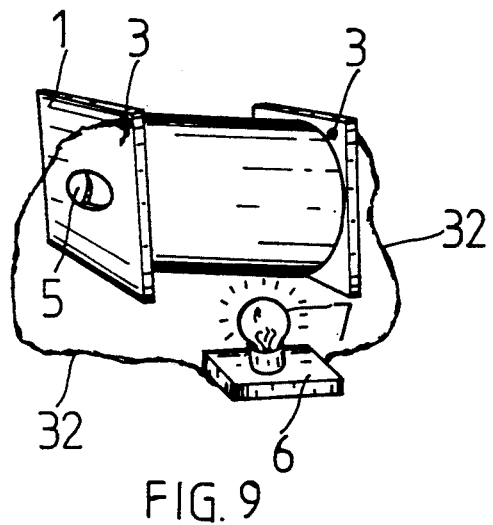
FIGS. 9 and 10 are perspective views illustrating the coupling of the device to the electric appliance.
Figure 10:
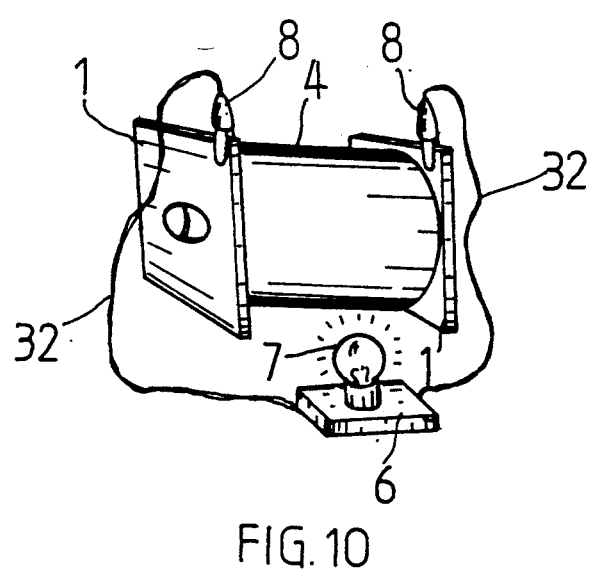

Referring next to FIG. 9, an electric wire 32 has one end coupled to each of the plates 1 by the screw 3 and has the other end coupled to a socket 6 which supports, for example, a lamp 7, such that the lamp 7 can be easily energized by the battery 4. As shown in FIG. 10, instead of the screws 3, a clip 8 can also couple the electric wire 32 to the plate 1.

Figure 11:
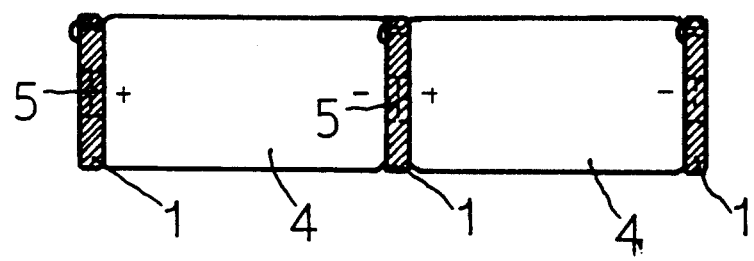
FIGS. 11, 12 and 13 are schematic views illustrating the applications of the present invention.

Referring next to FIG. 11, the thickness "T" of the plate 1 is thicker than the protruded length of the center electrode 5 of the batteries 4, such that, when three plates 1 are used, two batteries 4 can be easily coupled together in series.

Figure 12:
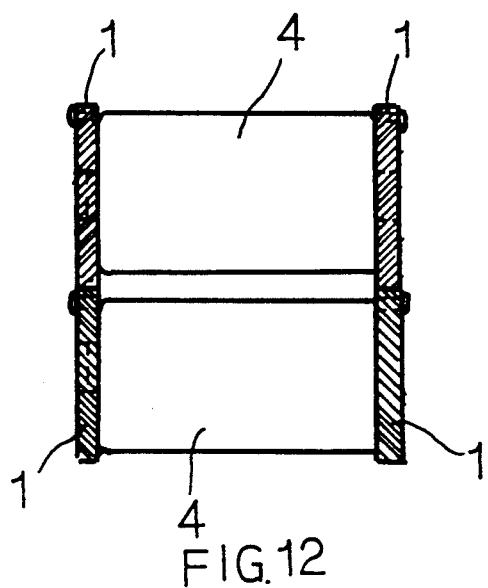

Referring next to FIG. 12, two plates 1 are coupled to the electrodes of each of the batteries 4 respectively, and coupled to the plates of the other battery 4 such that two batteries 4 can be easily coupled in parallel.

Figure 13:
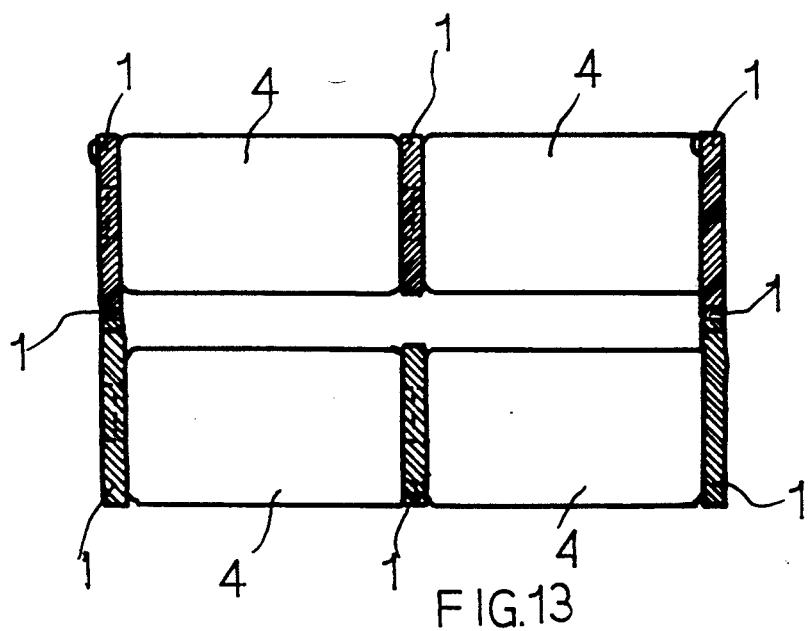

Referring next to FIG. 13, two pairs of batteries 4 are coupled in series, and the two pairs of batteries can be easily coupled together in parallel, in which the four outer plates are preferably attracted with one another with the height "H" thereof such that the two pairs of batteries 4 can be separated from each other, and the two intermediate plates 1 are arranged such that they will not contact with each other.

Accordingly, batteries can be easily coupled to an electric appliance either in series or in parallel by the device in accordance with the present invention.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A device for coupling at least one battery to an electric appliance comprising a first magnetic plate having an opening formed therein for engagement with a center electrode of said battery, means for electrically coupling said first magnetic plate to said electric appliance, a second magnetic plate attractable to an electrode of said battery, and means for electrically coupling said second magnetic plate to said electric appliance in order to energize said electric appliance, said means for electrically coupling said magnetic plates to said electric appliance including electric wires, each having a first end connected to said electric appliance and having a second end connected to a respective said magnetic plate by a screw.

2. A device for coupling at least one battery to an electric appliance comprising a first magnetic plate having an opening formed therein for engagement with a center electrode of said battery, means for electrically coupling said first magnetic plate to said electric appliance, a second magnetic plate attractable to an electrode of said battery, and means for electrically coupling said second magnetic plate to said electric appliance in order to energize said electric appliance, said center electrode of said battery having a protruded length slightly less than the thickness of said first magnetic plate.

3. A device for coupling at least one battery to an electric appliance comprising a first magnetic plate having an opening formed therein for engagement with a center electrode of said battery, means for electrically coupling said first magnetic plate to said electric appliance, a second magnetic plate attractable to an electrode of said battery, and means for electrically coupling said second magnetic plate to said electric appliance in order to energize said electric appliance, said means for electrically coupling said magnetic plates to said electric appliance including electric wires, each having a first end connected to said electric appliance and having a second end connected to a respective said magnetic plate by a clip.

* * * * *